United States Patent [19]

Huegli

[11] Patent Number: 4,963,408
[45] Date of Patent: Oct. 16, 1990

[54] STRUCTURAL UNITARY COMPOSITE LAMINATE STRUCTURE AND METHOD FOR MAKING SAME

[75] Inventor: Ronald Huegli, Battle Ground, Wash.

[73] Assignee: Mono-Lite Corporation, Battleground, Wash.

[21] Appl. No.: 206,178

[22] Filed: Jun. 13, 1988

[51] Int. Cl.$^5$ ............................ B32B 5/12; B32B 3/26
[52] U.S. Cl. ........................................ 428/71; 428/74; 428/76; 428/110; 428/112
[58] Field of Search ................... 428/71, 76, 107, 109, 428/74, 110, 112

[56] References Cited

U.S. PATENT DOCUMENTS

| | | | |
|---|---|---|---|
| 2,962,323 | 11/1960 | McBride | 296/28 |
| 3,003,810 | 10/1961 | Kloote et al. | 296/31 |
| 3,535,198 | 10/1970 | Bloom | 161/161 |
| 3,573,144 | 3/1971 | Andersen | 161/38 |
| 3,989,562 | 11/1976 | Hladik et al. | 156/79 |
| 4,082,882 | 4/1978 | Weinstein et al. | 428/246 |
| 4,101,704 | 7/1978 | Hiles | 428/218 |
| 4,229,497 | 10/1980 | Piazza | 428/71 |
| 4,361,613 | 11/1982 | Bogner et al. | 428/119 |
| 4,463,043 | 7/1984 | Reeves et al. | 428/71 |
| 4,495,231 | 1/1985 | Laskaris et al. | 428/105 |
| 4,617,217 | 10/1986 | Michaud-Soret | 428/71 |
| 4,759,147 | 7/1988 | Pirazzini | 428/107 |

*Primary Examiner*—Alexander S. Thomas
*Attorney, Agent, or Firm*—Marger & Johnson, Inc.

[57] ABSTRACT

This invention relates to a unitary composite laminate structure, particularly as it relates to the manufacture of macro-scale unitary composite laminate structures. The laminate structure of this invention comprises a unitary composite having an inner core layer and an outer encapsulating layer co-adhered one to the other by a bonding material. The respective inner core and encapsulating layers are chemically fused together to produce the unitary structure. A high shear strength, load-bearing matrix is disposed between the respective inner core layer and the outer encapsulating layer. The matrix is oriented substantially entirely in the load bearing direction so that the unitary composite structure is capable of resisting delamination under conditions requiring high tensile and high shear strength.

14 Claims, 1 Drawing Sheet

STRUCTURAL UNITARY COMPOSITE LAMINATE STRUCTURE AND METHOD FOR MAKING SAME

BACKGROUND OF THE INVENTION

This invention relates to novel unitary composite laminate structures useful in the manufacture of products such as railroad cars, truck trailers, shipping containers, buildings, and to methods for making such unitary structures and products.

Multi-layer panels in which synthetic materials are adhesively bonded one to the other are known. These panels are interconnected by adhesive bonding, with adhesive curing occurring at ambient temperature and pressure. Accordingly, these panels have significant limitations in structural applications because of their propensity to delaminate under load conditions requiring a high level of tensile and shear strength.

The following are examples of such adhesively interconnected panels. In U.S. No. 4,101,704, a low energy absorbent panel comprising a first inner layer of elastomeric non-cellular polyurethane having a low compression set, is interconnected to a less compressible second inner layer comprising a flexible polyurethane matrix in which a multiplicity of hollow bodies are embedded. The first and second inner layers are encased within a pair of outer skin layers. U.S. No. 4,361,613 describes an insulating, fire-resistant, multi-layered panel comprising first and second spaced apart outer sheets overlying upper and lower composite facing sheets interconnected to a foam core. The outer sheets are made from a polyvinyl fluoride material, Tedlar ™. A layer of chopped fiber strands and adhesive resin are built-up into the upper and lower composite facing sheets. U.S. No. 4,617,217 provides a beam of great length in the form of a box structure comprising a core of a hard synthetic resin foam, such as polyurethane foam, around which are wound at least two superimposed independent layers of glass fabric whose threads are oriented at 45° with respect to the longitudinal axis of the core. These fabrics are impregnated with a resin which is polymerizable. U.S. No. 3,535,198 is a laminated multi-layer structural panel for outdoor use as wall or roof panels formed of a pair of halflaminates comprising a foamed core of polyurethane or a cyclic ether bonded in situ to a pair of rigid outer facing sheets. The half-laminates are bonded together along their foam interface with an adhesive material.

Attempts have been made to incorporate multilayer, interconnecting panels in structural applications such as railroad cars, trailers and buildings. Shear stress and tensile-elongation problems are present when these structures are employed for such uses. Furthermore, none of these are unitary composite structures. For instance, U.S. No. 2,962,323 relates to an insulating chamber which must be supported within a fixed structural enclosure for the above uses. Since these panels are not effective as load-bearing structures, an inner structural enclosure must be provided. U.S. 3,989,562 relates to a container or a body for a road vehicle or rail vehicle, the body comprising an inner tube formed of a wound laminate of synthetic resin impregnated material, an outer tube formed of a wound laminate of synthetic resin impregnated material and spaced from the inner tube, and insulating material and reinforcing material all being securely interconnected. The impregnated material may comprise filaments and/or fabric. The insulating material may be a foamed material such as rigid lightweight polyvinyl chloride. There is no substantial interconnection between the respective windings thereby creating major delamination problems when structural shear forces are applied. More specifically, these delamination problems will result between layers of the windings. The structure produced is heavy and extremely brittle. There are also major expansion-contraction coefficient problems between the construction materials, i.e. between the windings and the metal. U.S. No. 4,082,882 relates to multi-layer structural sandwich members comprising an inner core of plywood, medial layers of fiberglass mats of crossed fiber or woven roving with a waffle pattern and a general purpose resin, and outer layers of films of an acrylate copolymer. Adhesion problems result when plywood is bonded to a polymeric at room temperature. Plywood is also a problem when used as a core material since it is organic and therefore biodegradable, and also has a high moisture content. U.S. No. 3,573,144 is directed to a sandwich panel comprising first and second face sheets and a rigid core bonded therebetween. The core comprises parallel rows of alternately oppositely undulated resin impregnated fibrous webs and a series of spacer blocks extending transversely of the fibrous web rows and alternately under and over adjacent webs, to define the oppositely undulated arrangement of the web. The spacer blocks can comprise polyvinyl chloride foam and the fibrous webs can comprise glass cloth. The top and bottom face sheets are unitary sheets of metal or composites such as glass-resin composites especially glass cloth with epoxy resin impregnation. The resin impregnated fibrous webs of the core structure also employ epoxy resin throughout the glass cloth to rigidly fix the blocks in their arranged locations. Shear strength is a substantial problem in view of difficulty in bonding together disparite core elements as described above. Finally, U.S. No. 3,003,810 is a vehicle body constructed of a composite structure of synthetic resin materials. The trailer body comprises assembled modular panel units. A typical panel consists of a central core which is adhesively interconnected to a rigid sublamina. The exposed face of each sublamine is covered with a structural skin. The core is made of a lightweight, low density, cellular material. Sublaminae is a high density, foamed polymer or plywood or hardboard. Facing skins are resinous materials which can be reinforced with a fibrous material, such as a woven filamentary glass web.

Therefore, a need exists for a laminate structure of unitary composite design for use in previously described products which is bonded together to avoid delamination under shear conditions, and which exhibits a high degree of tensile elongation strength under high load bearing conditions.

SUMMARY OF THE INVENTION

This invention relates to a unitary composite laminate structure which resolves all of the abovedescribed needs existing in the prior art, particularly as they relate to the manufacture of macro-scale unitary composite laminate structures such as in buildings, truck trailers, railroad cars, shipping and storage containers, and the like.

The laminate structure of this invention comprises a unitary composite having an inner core layer and an outer encapsulating layer co-adhered one to the other by a bonding material. The respective inner core and encapsulating layers are chemically fused together to produce the unitary structure. A high shear strength, load-bearing matrix is disposed between the respective inner core layer and the outer encapsulating layer. The matrix is oriented substantially entirely in the load bearing direction so that the unitary composite structure is capable of resisting delamination under conditions requiring high tensile and high shear strength.

The unitary structure preferably comprises a respective inner core, outer encapsulating and load bearing matrix having substantially the same coefficients of expansion and contraction, thereby minimizing material separation problems. This permits, for example, the unitary structure to be exposed to an extensive temperature range without the resultant delamination problems inherent in most composites. The load-bearing matrix typically comprises a plurality of load-bearing synthetic filaments, particularly uncrimped, load-bearing synthetic filaments which are physically connected together to prevent movement of the filaments under load conditions. Crimping of the filaments results in a substantial reduction in the physical strength of the load bearing matrix. The load-bearing filaments are physically connected together for maintaining the maximum physical strength of the matrix and for preventing delamination under load conditions, and are typically connected by knitting the filaments together.

Preferably, the load-bearing matrix of the present invention comprises a plurality of layers of the load-bearing synthetic filaments. The filaments in each individual layer of the matrix are arranged in an angular orientation with respect to the longitudinal axis of the laminate structure. Furthermore, the filaments in each of the layers are arranged in a different angular orientation with respect to the longitudinal axis of the laminate structure. The load-bearing matrix generally comprises multiple layers of synthetic filaments which are arranged in an angular orientation of from about 0° to 90°, preferably from about +60° up to about −60°, and most preferably from about +45° up to about −45°, all with respect to the longitudinal axis of the composite structure. The load bearing matrix preferably comprises at least two layers of synthetic filaments, more preferably at least three layers of the filaments, and most preferably a load-bearing matrix comprising three layers of the filaments, first and second layers angularly oriented at from 0° to 90°, and a third layer angularly oriented at above 0°, all with respect to the longitudinal axis of the composite structure. The load-bearing matrix preferably comprises a plurality of glass filaments.

The unitary composite structure can include means attached to the load-bearing matrix for absorbing forces imparted to the structure and thereby minimizing the effects of shear stress. Generally, the core material comprises a rigid polymeric high density polymeric foam for providing additional impact resistance to the unitary structure of the subject invention, and/or a low density polymeric foam for substantially eliminating water permeability and providing improved insulating properties. The outer encapsulating material typically comprises vinyl fluoride polymer.

A method for producing the unitary composite laminate structure is typically provided by first forming an inner core layer. Then, a load-bearing matrix is formed about the inner core layer including axial material positioned within the structural matrix to carry substantially all of the load bearing requirement of the composite laminate structure. A bonding material is applied to the load-bearing matrix and the inner core layer, respectively. An encapsulating layer is then wrapped about the load-bearing matrix and bonding material. The respective inner core and outer encapsulating layers are co-adhered to the bonding material by applying sufficient heat and/or pressure to form the composite laminate structure in this way, the respective inner and outer layers are chemically fused together with the bonding material and air entrapped between the respective layers removed for liberating or reacting any and all unreactive monomeric material present.

By employing the present invention, macro-scale unitary composite laminate structures can be produced including an entire, single-piece truck trailer or railroad car wall, particularly the top wall, bottom wall and/or sidewalls; or an entire single-piece modular building wall; or a shipping and storage container top, bottom or side wall. The single-piece, macro-scale unitary composite comprises a laminate structure as described above except that it has longitudinal and lateral dimensions of at least about twice that of a conventional panel employed for a comparable end use. Typically, the longitudinal dimension is at least about 16 feet, and said lateral dimension is at least about 8 feet. Preferably, the laminate structure is from about 8 to 12 feet in the lateral dimension, and from about 16 to 90 feet in the longitudinal dimension.

The foregoing and other objects, features and advantages of the invention will become more readily apparent from the following detailed description of a preferred embodiment which proceeds with reference to the drawings.

DETAILED DESCRIPTION OF DRAWINGS

DETAILED DESCRIPTION OF THE PREFERRED EMBODIMENT

Figure 1:
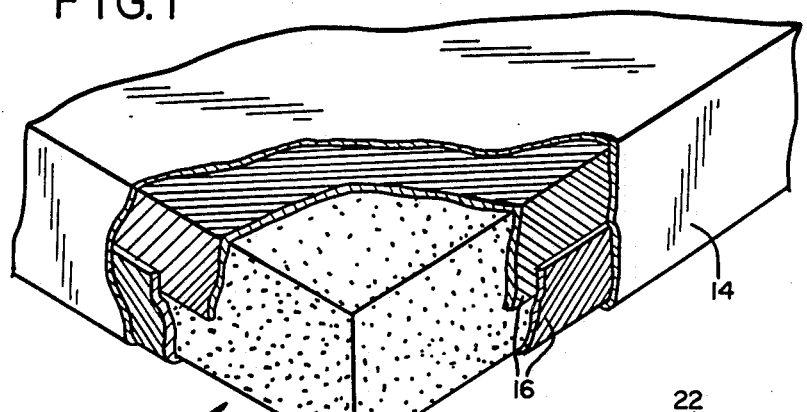
FIG. 1 is an illustrative, sectional, perspective view of a unitary composite laminate structure of the present invention.

Referring now to FIG. 1, a unitary composite laminate structure 10 is provided which comprises an inner core layer 12 and an outer encapsulating layer 14 with a high strength, load-bearing matrix 16 disposed therebetween. The laminate 10 can be fabricated to form a structural product having high strength to weight ratios, excellent insulating properties, durability, excellent weather resistance, resistance to a wide variety of chemicals, solvents, and staining agents, non-combustibility, waterproof, rot-proof, rodent-resistant. Certain of these structures can also be used in monocoque construction applications.

The inner core layer 12 comprises a structural and/or insulating component of the unitary composite laminate structure 10. As a structural component, inner core layer 12 provides substantial vertical and horizontal shear strength. It can also function as an insulating member. In any case, the inner core layer is preferably a thin, lightweight composite having a minimal degree of flexure. For structural integrity purposes, a high density, rigid polymeric foam such as high density PVC foam can be produced from a blown, closed cell polymeric material employing various gases as a blowing agent. A closed cell structural foam core substantially eliminates water permeability to the structure itself. A preferred high-density polymeric foam is a PVC foam. Another high strength material which can be employed, particularly in applications such as home building, is a molded structure of inorganic materials. For example, a compression molded silica-based material such as diatamaceous earth can be employed for this purpose. Inner core 12 may also be fabricated from a low-density polymeric foam material for providing a high-level of thermal and accoustical insulating to the unitary structure 10. In a preferred embodiment of this invention, a structural core can comprise alternate layers of high and low density structural foam. For example, a core layer can comprise a first outer layer of high density structural foam, an intermittent layer of low density structural foam, and a second outer layer of high density structural foam, the high density layers of foam providing a thin, high density core enabling the structure to have a higher impact resistance, and the low density foam providing for an increase in the insulating and accoustical quality of the core layer itself.

The load-bearing matrix 16 located between inner core layer 12 and outer encapsulating layer 14 is generally of a type that can be oriented substantially entirely in the load-bearing direction of the unitary structure 10. In other words, substantially all of the load-bearing properties of matrix 16 are in the direction of the load-bearing forces. The load-bearing matrix 16 is typically provided in a single unitary layer which is designed to surround the laminate structure thereby eliminating problems attendant with lapping of multiple sections of load-bearing materials in a given layer. This establishes a substantial load-bearing capability over the entire surface of the unitary structure, not in the separate sections of the load-bearing structure, and thereby produces load-bearing joints. If one utilizes a fabric which does not completely surround the inner core layer 12, overlapping joints will be formed which are not load-bearing joints, but instead become a shear joint which will delaminate under tensile and or shear conditions. The load-bearing matrix preferably comprises a plurality of synthetic filaments oriented substantially entirely in the load-bearing direction of structure 10. Glass filaments are typically employed for this purpose. Preferably, the load-bearing matrix comprises multi-axial layers, each layer including load-bearing synthetic filaments arranged in an angular orientation with respect to the longitudinal axis of the laminate structure. Thus, the layers of synthetic filaments are arranged within the load-bearing matrix as depicted in FIGS. 2 and 3, respectively.

Figure 2:
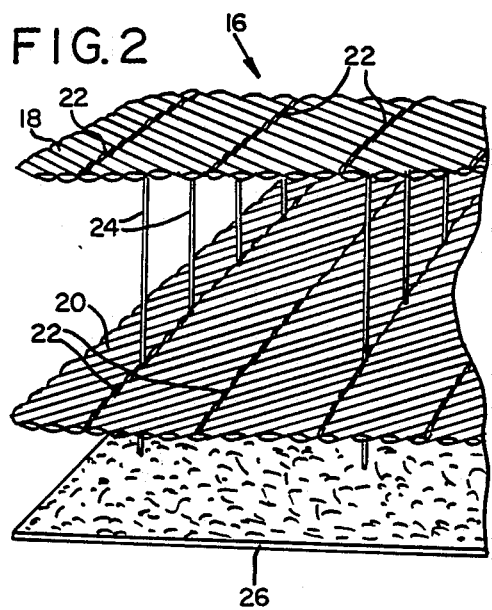
FIG. 2 is an illustrative, exploded, perspective view of a two-layer, load-bearing matrix which can be used in the laminate structure of FIG. 1.

In FIG. 2, a biaxial composite material 16 in which a load-bearing knitted matrix is shown comprising two layers 18, 20 of filament, each layer comprising angularly-oriented filaments. A third layer, fibrous mat 26, will be hereinafter described. In this case, the filaments in layer 18 are arranged at a 45° angular orientation, and in layer 20 at a −45° angular orientation, both with respect to the longitudinal axis of the composite material. The filaments in layer 18 and layer 20 are physically held together by stitching 22. The entire biaxial composite material 16, including fibrous mat 26, is physically held together by knitting material 24. The filaments generally remain under tension within the unitary structure. The matrix can extend not only across the sides of the structure but around the corner to the 90° axis of the structure transmitting the load from the side walls to any adjoining structure connected thereto. At the edges of the laminate structure the load-bearing matrix overlaps the inner core 12 so that no butt joints occur. This overlap occurs at a radius joint thereby insuring the strongest lap joint and minimizes the chances for shear separation.

Figure 3:
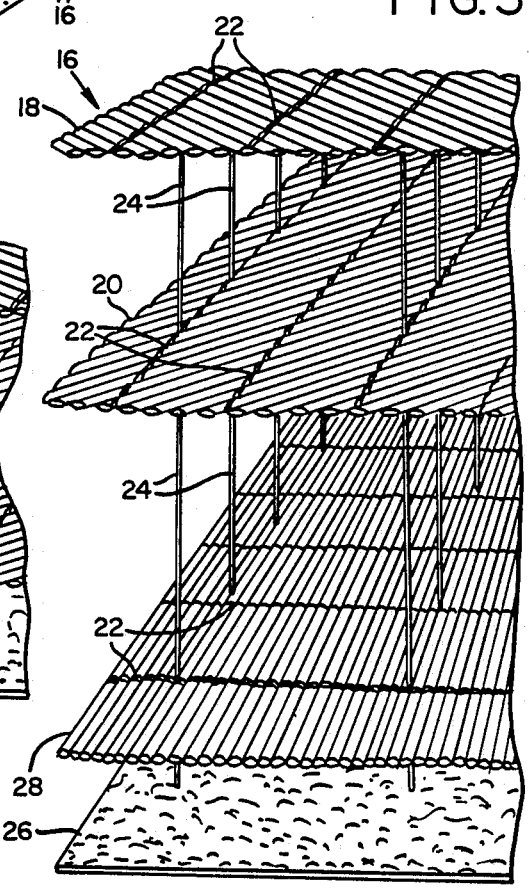
FIG. 3 is an illustrative, perspective view of the three-layer load-bearing matrix which can be used in the laminate structure of FIG. 1.

In FIG. 3, a triaxial composite material 16 in which another load-bearing knitted matrix is depicted comprising three layers 18, 20, 28 of angularly-arranged filaments, and a fourth layer comprising fibrous mat 26. The filaments in the first and second layers, as in the biaxial composite of FIG. 2, are arranged at an angular orientation of +45° and −45°, respectively. The filaments in third layer 28 are arranged at an angular orientation of about 0° with respect to the longitudinal axis of the laminate structure. As in the case of the biaxial material of FIG.2, each layer of the triaxial material of FIG. 3 is physically connected by stitching 22, and the entire structure 16, including fibrous mat 26, is physically combined by knitting material 24.

The filament bundles in the two composite layers in FIG. 2 and the three composite layers in FIG. 3, respectively, are physically connected, i.e., knitted together, to form knitted matrix load-bearing filaments. In general, the filaments are laid flat and knitted together by knitting material 24, thereby eliminating the filament crimping that is present when filaments are themselves interconnected by weaving the filaments together so that they cross over and under one another. The load-bearing filaments forming the load-bearing matrix are physically interwoven using knitting material 24 since conventional weaving of the filaments themselves crimps the filaments, thereby reducing the structural integrity of the matrix. A fabric made by such filament weaving yields approximately 30%–40% of the structural integrity of the filaments themselves because of the crimping action resulting from the formation process. Therefore, the filaments employed in the present invention, particularly glass rods, are maintained in a straight line load-bearing bundles maintaining each of the bundles in a given load-bearing direction in a given layer. In this way, the load-bearing matrix of the invention provides a maximum level of structural integrity per unit weight of filaments. The filaments in the knitted matrices can be arranged in a variety of multi-axial configurations without a prohibitive increase in cost and without adverse effect on processing characteristics. The filaments used in these composites are typically made of glass, aramid, graphite, or polyester, or combinations thereof. A preferred knitted matrix is the CDB 340 triaxial interwoven fabrics manufactured by Knytex, Inc. of Sequin, Texas. The CDB 340 material is an interwoven triaxial fabric in which the load-bearing filaments in the three layers are arranged for a respective angular orientation of +45° in layer one, −45° in layer two, and 0° in layer three.

Preferably, the above knitted matrix 16 has a mat of fibers 26 (typically 1' to 2' in length) physically connected to triaxial interwoven fabric by knitting material 24. These fibers can be formed into a mat 26 using sizing material or other conventional adhesive material to hold the mat together. In the scope of the present invention, connecting the fibrous mat to the load-bearing matrix imparts substantial impact resistance to the unitary composite laminate structure. This random fiber mat is preferably located adjacent the inner core to increase the effective bonding of the inner core, and in turn the laminate structure itself, thereby minimizing the effects of shear stress. Utilizing such a random fiber mat increases the impact surface area and the directional shear carrying capabilities of the laminate structure, thereby distributing the effect of these delaminating forces.

A further feature of the subject multi-axial load-bearing matrix is that it more readily retains bonding material within its intertices thereby providing a maximum weight of filaments per weight of bonding material. Therefore, at a given total weight of the unitary composite laminate structure, a maximum co-adhered structure with a minimum amount of bonding material can be produced because of the high retention level of bonding material that occurs. Stated another way, it is possible to employ this invention to effectively co-adhere the load-bearing synthetic filaments with the least relative amount of bonding material and minimizing entrapped air, so as to produce a lightweight, co-adhesively bonded unitary structure.

The outer encapsulating layer 14 comprises a surface membrane capable of providing an extended laminate life span. Preferably, the encapsulating layer is pinhole-free for preventing contact between oxygen in the atmosphere and the inner portion of the unitary laminate structure. For instance, if the inner structure is exposed to oxygen during the curing process, co-adhering of the inner core layer and outer encapsulating layer to the bonding material is inhibited. If the outer encapsulating layer is pinhole-free, UV light attack of the bonding material is prevented. More specifically, UV light tends to deteriorate and weaken co-adherence of the cured bonding layer. Finally, it is preferred that the capsulating layer be chemically resistant to the external effects of alkaline and acids. In outdoor applications, for example, acid rain and alkaline substances are present in the environment itself and can deteriorate encapsulating layer 14. The encapsulating layer of this invention substantially eliminates the effects of these contaminants and provides an effective barrier for the unitary composite laminate structure 10.

The various structural layers which form the composite laminate are co-adhered one to the other by a bonding material capable of fusing together the inner and outer layers. These bonding materials can comprise a variety of adhesive compounds such as thermosetting resins and may include polyester, vinyl ester, and epoxy thermosetting resins. The appropriate catalyst is employed with whichever adhesive material is selected.

In the co-adhesion process of the present invention all of the respective components are brought together and formed into a unitary composite laminate structure. One process which can be employed to accomplish the co-adhesion process is compression molding. This co-adhesion process is important because a major factor in the failure of a laminate construction is delamination due to the creation of shear forces between the laminate plies. This shear then becomes a weak point in the structure itself. This co-adhesion process does several things. It can increase the pressure on the composite laminate, typically from about 5 psi to 200 psi, forcing any trapped air thereout. It can elevate the temperature of the bonding material to between about 50° to 400° F, and preferably 100° to 200° F. At such elevated temperature and/or pressure conditions, co-adhesion occurs so that the bonding materially actually fuses molecularly to the respective encapsulating and core layers. This yields the highest shear strength potential possible. Furthermore, with this process, at elevated temperature conditions the fibers from the fibrous mat embed themselves into the core layer 12, further increasing the shear strength and the level of chemical fusing between the bonding material and the core layer.

Elevating the temperature during processing also cross-links any free, unreacted, gaseous monomer associated with the bonding material. This monomer must be cross-linked in order to avoid a continuous out-gassing of the unitary structure and permits compliance with FDA rules and regulations. To meet FDA approval, the unitary structure must liberate less than 50 parts per million of gaseous monomer. By employing the process of the subject invention, preferably less than 5 parts per million of unreacted gaseous monomer is present in unitary structure 10. The preferred compression molding process provides the ability to make a unitary structure of up to about 14 feet wide in a continuous formation process. The material exiting the throat of the dies is substantially fully cured and in a ready-to-use form. Another process which is similar to a protrusion process can be employed wherein the composite materials are actually pulled through a compression molding die. The configuration of the composite structure then becomes the same as the cross-sectional configuration of the die through which the material is pulled.

The compression molding process combines the materials as indicated above into a given area forming a precise shape to be utilized in the manufacture of the structure itself. This also creates a non-oxygen atmosphere process providing substantial cure capabilities to the molding process itself. The compression molding process of this invention can mold at a high rate and turn out parts at approximately 10 to 15 feet per minute. We also are capable of maintaining and utilizing close tolerances throughout this process. This compression molding process controls the volume of bonding material and catalyst enabling us to control to a very close degree the temperature exotherm created in any given spot therefore yielding the highest potential structural integrity from the bonding material itself. By controlling formation and the cooling temperatures the dimensional tolerances and warping can be closely controlled. This is essential in high production, high volume applications.

The unitary composite laminates of the present inventions can be used in making three-dimensional, rectangular structures, particularly those previously described, including railroad cars, truck trailers, shipping containers, storage containers, buildings, both commercial and residential, and the like. One reason for this is that all of the surfaces in the structure can be utilized as load-bearing surfaces, such as the walls, floors and ceiling. Preferably, a monocoque unit can be constructed. This monocoque constructed unit does not require any additional frame to support any of the load carrying capabilities of the rectangular structure.

Figure 4:
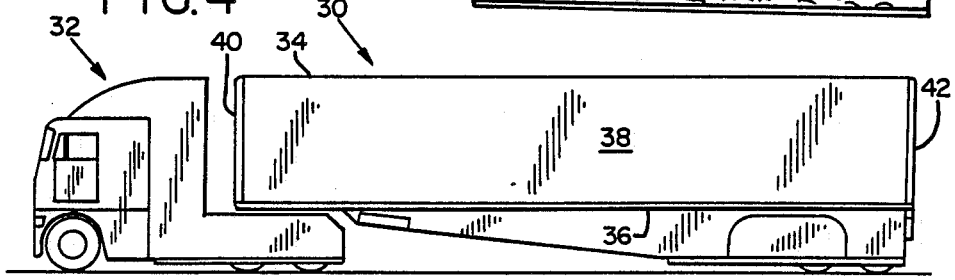
FIG. 4 is a side view of a truck and truck trailer, the truck trailer including a macro-scale unitary composite laminate top wall and sidewalls, respectively.

An important use of the laminate structure 10 is in the previously described macro-scale unitary composite structures which can be effectively incorporated into products such as the truck trailer 30 attached to truck 32 which is depicted in FIG. 4. Truck trailer 30 comprises top wall 34, bottom wall 36, side walls 38, front wall 40 and back doors 42. In this case, the entire top, bottom and side walls of truck trailer 30 each can be fabricated in the form of the unitary composite laminate structure of this invention so that each comprises an entire single-piece unit of macro-length without any intermittent connections. The subject large scale unitary structures overcome the prior art problems inherent in combining a plurality of individual panel sections joined one to the other to form, for example, the macro-scale outer walls of a truck trailer. The design and the nature of the individual structural components of the macro-scale composite laminate structure of the present invention can also be readily varied depending on the end use conditions. In general, the single-piece, macro-scale structures of this invention, such as the side, top, and bottom walls of truck trailer 30, is produced so that the longitudinal and lateral dimensions of the structures are at least about twice that of a conventional panel employed for a comparable end use. For instance, conventional panels of plywood or other construction materials are sold in a standardized 4 foot by 8 foot size. However, the subject single-piece, macro-scale structures will be fabricated in at least an 8 foot by 16 foot configuration. Generally, the macro-scale structures are from about 8 to 16 feet in the lateral dimension, and 16 to 90 feet in the longitudinal dimension. In the case of sidewall 38, top wall 34, and bottom wall 36 of truck trailer 30 of FIG. 4, they will typically be from about 8 to 12 feet in the lateral dimension, and 48 to 60 feet in the longitudinal dimension. Railroad cars, on the other hand, generally will be from about 10 to 16 feet in the lateral dimension, and 60 to 90 feet in the longitudinal dimension. As for shipping containers, they are for the most part from about 8 to 12 feet in the lateral dimension, and 36 to 60 feet in the longitudinal dimension. The macro-scale structures of this invention can also be employed in climate-control structures such as trailers, railroad cars, shipping containers and buildings, since they could be manufactured with both the requisite strength and insulative properties.

In a preferred design of a three-dimensional structure, two different cord lengths can be provided for the load-bearing structures, comprising an inside composite surface and an outside composite surface. This increases the load carrying capabilities and decreases the capabilities of the three-dimensional structure for racking and crushing.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A unitary composite laminate structure comprising:
an inner core layer and an outer encapsulating layer co-adhered one to the other by a bonding material for fusing together said inner and outer layers to produce said unitary structure, and a high shear strength, load-bearing matrix comprising a plurality of uncrimped, load-bearing synthetic filaments which are physically connected together to prevent movement of said filaments under load conditions, said load-bearing matrix disposed between said respective inner core layer, said outer encapsulating layer, being oriented substantially entirely int he load bearing direction, said unitary composite structure including means attached to said load-bearing matrix for absorbing forces imparted to said structure and thereby minimizing the effects of shear stress and being capable of resisting delamination under load conditions requiring high tensile and high shear strength, and said force absorbing means comprising a mat of synthetic fibers which are physically attached to said load-bearing matrix.

2. The unitary composite laminate structure according to claim 1, wherein said respective inner core, outer encapsulating and load bearing matrix having substantially the same coefficient of expansion and contraction.

3. The unitary composite laminate structure according to claim 1, wherein said load-bearing matrix comprises a plurality of layers of load-bearing synthetic filaments, each layer comprising a plurality of filaments arranged in an angular orientation with respect to the longitudinal axis of said laminate structure.

4. The unit composite laminate structure according to claim 1, wherein said filaments in each layer are arranged in an angular orientation of from about 0° to 90° with respect to the longitudinal axis of said laminate structure.

5. The unitary composite laminate structure according to claim 1, wherein said load bearing matrix comprises at least two layers of said filaments.

6. The unitary composite laminate structure according to claim 1, wherein said load-bearing matrix comprises three layers of said filaments, a first layer angularly oriented at from about 0° to $-90°$, a second layer angularly oriented at from about 0° to $+90°$, and a third layer angularly oriented at about 0° with respect to the longitudinal axis of said laminate structure.

7. The unitary composite laminate structure according to claim 1, wherein said load-bearing matrix comprises a plurality of glass filaments.

8. The unitary composite laminate structure according to claim 1, wherein said outer encapsulating material comprises vinyl fluoride polymer.

9. The unitary composite laminate structure according to claim 1, wherein said inner core comprises any one of a high density structural foam material, low density insulating foam material, and both a high density structural foam material and a low density insulating foam material, respectively.

10. A single piece, macro-scale unitary composite laminate structure comprising an inner core layer and an outer encapsulating layer co-adhered one to the other by a bonding material for fusing together said inner and outer layers to produce said unitary structure, and a high shear strength, load-bearing matrix comprising a plurality of uncrimped, load-bearing synthetic filaments which are physically connected together to prevent movement of said filaments under load conditions, said load-bearing matrix disposed between said respective inner core layer, said outer encapsulating layer, being oriented substantially entirely in the load bearing direction, said unitary composite structure including means attached to said load-bearing matrix for absorbing forces imparted to said structure and thereby minimizing the effects of shear stress and being capable of resisting delamination under load conditions requiring high tensile and high shear strength, and said force absorbing means comprising a mat of synthetic fibers which are physically attached to said load-bearing matrix, said single-piece, macro-scale unitary structure having a longitudinal dimension of at least about 16 fee, and a lateral dimension of at least about 8 fee, respectively.

11. The single-piece, macro-scale unitary composite laminate structure of claim 10, which comprises any one of a load-bearing truck trailer wall, a load-bearing railroad car wall, a load-bearing container wall, and a load-bearing building wall, respectively.

12. The single-piece, macro-scale unitary composite laminate structure of claim 10, which is from about 8 to 16 feet in the lateral dimension, and from about 16 to 90 feet in the longitudinal dimension.

13. The single-piece, macro-scale unitary composite laminate structure of claim 10, which comprises any one of a load-bearing top wall, load-bearing bottom wall, sand load-bearing sidewall, respectively.

14. The single-piece, macro-scale unitary composite laminate structure of claim 10, which comprises a load-bearing top wall, a load-bearing bottom wall, and load-bearing sidewalls of either one of a truck trailer and a railroad car.

* * * * *